(12) United States Patent
Yamamoto et al.

(10) Patent No.: US 6,338,401 B1
(45) Date of Patent: Jan. 15, 2002

(54) MOVEMENT CONTROL DEVICE

(75) Inventors: Yasuhiro Yamamoto; Tahei Morisawa, both of Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/541,620

(22) Filed: Apr. 3, 2000

Related U.S. Application Data

(62) Division of application No. 08/813,664, filed on Mar. 7, 1997, now Pat. No. 6,122,456.

(30) Foreign Application Priority Data

Mar. 12, 1996 (JP) .......................... P08-083319
Mar. 15, 1996 (JP) .......................... P08-087470
May 31, 1996 (JP) .......................... P08-160625

(51) Int. Cl.⁷ ............................................. F16H 35/00
(52) U.S. Cl. .......................... 192/21; 74/354; 74/384; 192/30 W
(58) Field of Search ............... 74/384, 354; 192/20, 192/21, 30 W

(56) References Cited

U.S. PATENT DOCUMENTS

| | | | |
|---|---|---|---|
| 4,616,913 A | 10/1986 | Suzuki et al. | |
| 4,728,975 A | 3/1988 | Ohara et al. | |
| 5,020,386 A | * 6/1991 | Taig | 74/384 |
| 5,150,630 A | * 9/1992 | Kida et al. | 74/534 |
| 5,424,156 A | 6/1995 | Aoki et al. | |
| 5,445,340 A | 8/1995 | Wakabayashi et al. | |
| 5,727,244 A | 3/1998 | Kitazawa | |
| 5,781,810 A | 7/1998 | Wakabayashi | |
| 6,122,456 A | * 9/2000 | Yamamoto et al. | 396/429 |

FOREIGN PATENT DOCUMENTS

| | | | |
|---|---|---|---|
| EP | 0 290 231 | * | 11/1988 |
| JP | 58-214055 | * | 12/1983 |
| JP | 5-2280 | | 1/1993 |

* cited by examiner

*Primary Examiner*—Rodney H. Bonck
(74) *Attorney, Agent, or Firm*—Greenblum & Bernstein, P.L.C.

(57) ABSTRACT

A movement control device has a DC motor by which a recording medium is moved by one frame of image, and a stepping motor by which a recording medium is moved by a small predetermined amount. A driven gear fixed on the output shaft of the DC motor is meshed with a gear of a moving mechanism on which the recording medium is mounted. A clutch has a transmitting gear which is rotatably supported by an rotatable arm and can be meshed with the driven gear. The rotatable arm is rotated by the stepping motor. When the stepping motor is rotated in the forward direction, the rotatable arm is rotated in a first direction, and thus the transmitting gear is meshed with the driven gear at a first point. When the stepping motor is rotated in the reverse direction, the rotatable arm is rotated in a second direction reverse to the first direction, and thus the transmitting gear is meshed with the driven gear at a second point different from the first point.

5 Claims, 8 Drawing Sheets

MOVEMENT CONTROL DEVICE

This application is a division of U.S. patent application No. 08/813,664, filed Mar. 7, 1997, now U.S. Pat. No. 6,122,456 the contents of which are expressly incorporated by reference in its entirety.

BACKGROUND OF THE INVENTION

1. Field of the Invention

The present invention relates to a device for moving a recording medium when an image is to be recorded on and read from the recording medium.

2. Description of the Related Art

Conventionally, as disclosed in Japanese Unexamined Patent Publication No. 5-2280 and U.S. Pat. No. 5,424,156, there is known a photographic material which is directly and electronically developed so that the developed visible image can be immediately obtained. In this specification, such a recording medium is referred to as an electro-developing recording medium, and an electronic still camera using the electro-developing recording medium is referred to as an electro-developing type camera.

In the electro-developing type camera, when an image obtained through a photographing optical system is recorded on the recording medium, the recording medium may be moved by one frame's worth of an image at every photographing operation. Subsequently, when the image recorded in the recording medium is read therefrom, the recording medium may be moved little by little so that a line sensor scans the image at every horizontal scanning line. Thus, two separate motors having different performances would be needed for carrying out the recording and reading operations. In such a camera, however, if a clutch is provided to select one of the two motors, the construction becomes complex and bulky.

SUMMARY OF THE INVENTION

Therefore, an object of the present invention is to provide a movement control device which has a simple and compact construction to move the recording medium one frame at a time or little by little, and further, to ensure a precise positioning of the recording medium for a high accuracy.

According to the present invention, there is provided a movement control device comprising a moving mechanism, a first motor, a second motor, and a clutch.

The moving mechanism moves the recording medium. The first motor is connected to the moving mechanism to move the recording medium at a first speed. The second motor is provided for moving the recording medium at a second speed slower than the first speed, by means of the moving mechanism. The clutch is provided between the second motor and the moving mechanism to connect and disconnect therebetween. When the second motor is rotated in the forward direction, the clutch operates in such a manner that the first and second motors move, in association with one another, the recording medium in a first direction. When the second motor is rotated in the reverse direction, the clutch operates in such a manner that the recording medium is moved in a second direction which is opposite to the first direction.

Further, according to the present invention, there is provided a movement control device comprising a moving mechanism, a drive motor, and a clutch.

The moving mechanism moves the recording medium. The drive motor moves the recording medium by means of the moving mechanism. The clutch is provided between the drive motor and the moving mechanism to connect and disconnect therebetween. When the drive motor is rotated in the forward direction, the clutch operates in such a manner that the drive motor is operated to move the recording medium in a first direction. When the drive motor is rotated in the reverse direction, the clutch operates in such a manner that the recording medium is moved in a second direction which is opposite to the first direction.

Furthermore, according to the present invention, there is provided a movement control device controlling a movement of a recording medium on which an image taken by a camera is recorded, the device comprising a moving mechanism, a first motor, a clutch, and a second motor.

The moving mechanism moves the recording medium. The first motor has a driven gear connected to the moving mechanism to move the recording medium. The clutch has a rotatable arm to which a transmitting gear is rotatably provided. The transmitting gear can be meshed with the driven gear. The second motor is connected to the clutch. Until the transmitting gear is meshed with the driven gear, the rotatable arm can be rotated in a first or second direction in accordance with the rotational direction of the second motor.

Further, according to the present invention, there is provided a connecting condition detecting device, the device comprising a driven gear, a rotatable arm, a transmitting gear, and a sensing unit.

The driven gear, the rotatable arm, and the transmitting gear are made of conductive material. A first electric potential is applied to the driven gear. A second electric potential which is different from the first electric potential is applied to the rotatable arm. The transmitting gear is rotatably provided on the rotatable arm, and can mesh with the driven gear. The sensing unit senses an electric potential of one of the driven gear and the rotatable arm so that a meshing condition between the transmitting gear and the driven gear is sensed.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
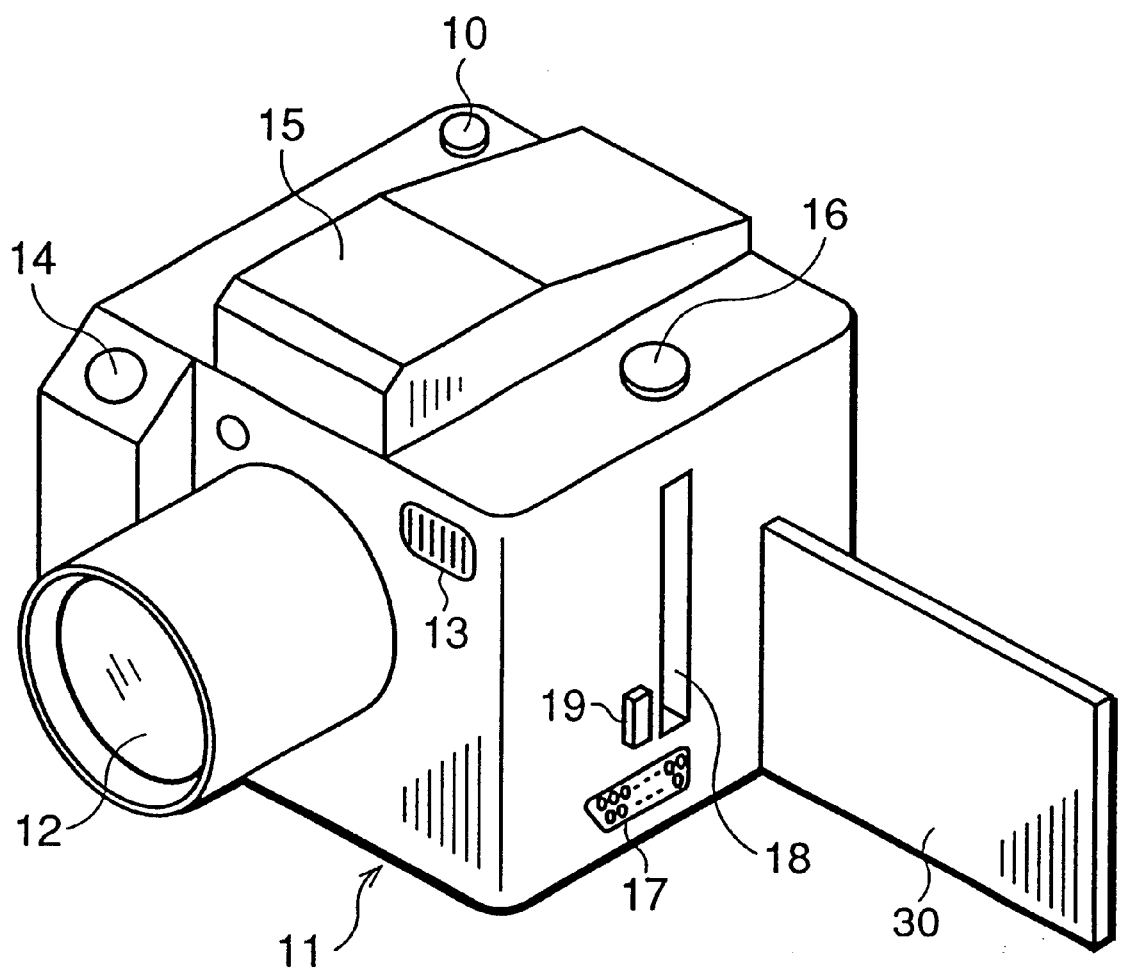
FIG. 1 is an external view showing an electro-developing type camera to which an embodiment of the present invention is applied.

FIG. 1 is an external view of an electro-developing type camera to which an embodiment according to the present invention is applied.

When viewing a camera body 11 from the front side, a photographing optical system 12 including a photographing lens system and so on is provided approximately at the center portion of the front surface of the camera body 11, and an electronic flash 13 is disposed thereon to the right of and above the photographing optical system 12. A release switch 14 is provided on the side opposite to the electronic flash 13.

On the upper surface of the camera body 11, a view-finder 15 is provided at the center portion thereof and is extended from the front to the rear end of the camera body 11. A main switch 10, by which an electric power can be turned ON, is provided on the upper surface and beside the view-finder 15. A scan start switch 16 is provided on the side opposite to the main switch 10. The scan start switch 16 is provided for starting a reading operation in which an image recorded on an electro-developing recording medium 30 is read.

An output terminal 17 is provided on a lower portion of a side surface of the camera body 11, so that an image signal obtained by this camera can be outputted to an external recording device (not shown). Further, a slot 18, into which the electro-developing recording medium 30 is mounted in the camera body 11, is formed on the side surface of the camera body 11, and an eject switch 19, which is pressed to remove the electro-developing recording medium 30 from the camera body 11, is provided close to the slot 18.

Figure 2:
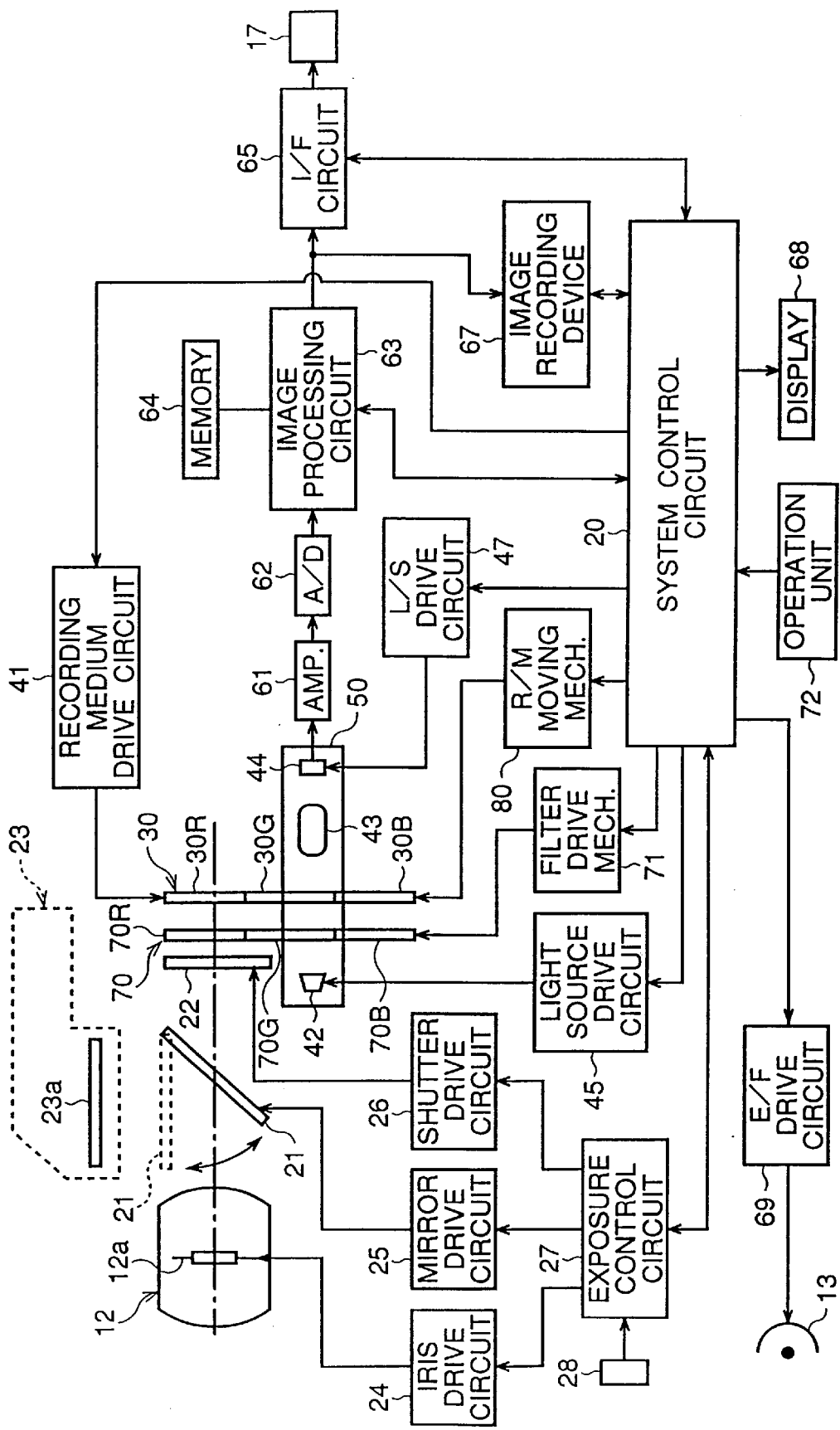
FIG. 2 is a block diagram of the electro-developing type camera shown in FIG. 1.

FIG. 2 is a block diagram of the electro-developing type camera, in which a system control circuit 20 including a microcomputer is mounted to control the electro-developing type camera as a whole.

The photographing optical system 12 has a plurality of lens groups and an aperture 12a. An electro-developing recording medium 30 is disposed behind the photographing optical system 12. A color filter (i.e., dichroic filter) 70 is provided in front of the electro-developing recording medium 30. A quick return mirror 21 is placed between the photographing optical system 12 and the color filter 70. A shutter 22 is provided between the quick return mirror 21 and the color filter 70. A focusing glass 23a included in a view-finder optical system 23 is disposed above the quick return mirror 21.

The electro-developing recording medium 30 has first, second, and third recording areas 30R, 30G, and 30B, each area corresponding to the size of one frame of an image. The color filter 70 has an R (red) filter element 70R, a G (green) filter element 70G, and a B (blue) filter element 70B, each of which has the same size as each of the recording areas 30R, 30G, and 30B, i.e., corresponding to one frame of an image.

The aperture 12a, the quick return mirror 21, and the shutter 22 are driven by an iris drive circuit 24, a mirror drive circuit 25, and a shutter drive circuit 26, respectively, which are controlled by an exposure control circuit 27.

The exposure control circuit 27 is operated in accordance with a command signal outputted by the system control circuit 20. Namely, when an exposure is controlled, the degree of opening of the aperture 12a is adjusted by the iris drive circuit 24 under control of the exposure control circuit 27 based on an output signal of a photometry sensor 28.

The quick return mirror 21 is usually set to a down position (an inclining position shown by the solid line in the drawing), so that a light beam passing through the photographing optical system 12 is directed to the view-finder optical system 23 to form an object image on the focusing glass 23a, and thus an object to be photographed can be observed by the photographer through the finder optical system (not shown). When a photographing operation is carried out, the quick return mirror 21 is rotated upwards by the mirror drive circuit 25 and set to an up position (a horizontal position shown by the broken line in the drawing), so that the light beam is directed to the electro-developing recording medium 30.

The shutter 22 is usually closed, but upon a photographing operation, the shutter 22 is opened for a predetermined period by the shutter drive circuit 26 under the control of the exposure control circuit 27, and thus, the light beam passing through the photographing optical system 12 enters a light receiving surface of the electro-developing recording medium 30, thus forming a two-dimensional image thereon.

An electric voltage (i.e., a recording medium activating signal) is applied to the electro-developing recording medium 30 under the control of a recording medium drive circuit 41. By exposing the electro-developing recording medium 30 while applying the voltage, an image formed by the photographing optical system 12 is developed on the electro-developing recording medium 30 as a visible image. Note that the recording medium drive circuit 41 is operated in accordance with a command signal outputted by the system control circuit 20.

A support member 50, which is fixed to a fixed frame (not shown), is provided close to the shutter 22. A light source 42, a scanner optical system 43, and a line sensor 44 are supported by the support member 50. The light source 42 has a plurality of LED (photodiodes). The line sensor 44 may be a one-dimensional CCD sensor of 2000 pixels, for example. The line sensor 44 may be of suitable length to completely cover and extend over one horizontal scanning line of the image formed on the electro-developing recording medium 30. The line sensor 44 serves as a photoelectric-conversion device, which converts an optical image to an electric signal. The scanner optical system 43 is disposed between the light source 42 and the line sensor 44. The light source 42, the scanner optical system 43, and the line sensor 44 are arranged in parallel to the optical axis of the photographing optical system 12.

The color filter 70 and the electro-developing recording medium 30 can be moved in a direction perpendicular to the optical axis of the photographing optical system 12. The color filter 70 and the electro-developing recording medium 30 are moved by a filter drive mechanism 71 and a recording medium moving mechanism 80, respectively.

In a photographing operation, the color filter 70 and the electro-developing recording medium 30 are moved as one, so that the centers of the R filter element 70R and the first recording area 30R, the centers of the G filter element 70G and the second recording area 30G, or the centers of the B filter element 70B and the third recording area 30B are positioned on the optical axis of the photographing optical system 12. When an image recorded on the electro-developing recording medium 30 is read, the color filter 70 is fixed at a position to retreat from the support member 50, i.e., the side of the shutter 22, for example. In this state, each of the recording areas 30R, 30G, and 30B is moved between the light source 42 and the scanner optical system 43 in a direction perpendicular to the optical axis of the scanner optical system 43. Namely, the image recorded on the electro-developing recording medium 30 is illuminated by the light source 42 and formed on the light receiving surface of the line sensor 44, through an operation of the scanner optical system 43.

ON and OFF control of the light source 42 is performed by a light source drive circuit 45. Control of the reading operation of pixel signals generated in the line sensor 44 is carried out by a line sensor drive circuit 47. The circuits 45 and 47 are controlled by the system control circuit 20.

Pixel signals read out from the line sensor 44 are amplified by an amplifier 61, and converted to a digital signal by an A/D converter 62. The digital pixel signals are subjected to a shading correction, a gamma correction, and so on by an image processing circuit 63 under the control of the system control circuit 20, and then temporarily stored in a memory 64. The memory 64 includes an EEPROM in which correction data for the shading correction are stored. Note that the memory 64 may have a storage capacity equal to one horizontal scanning line outputted from the line sensor 44, or may have a storage capacity of one frame's worth pixel signals.

The pixel signals read from the memory 64 are inputted to an interface circuit 65 through the image processing circuit 63, so that the pixel signals are subjected to a predetermined process such as a format conversion, and can then be outputted to an external computer (not shown) through the output terminal 17. The pixel signals outputted from the image process circuit 63 are subjected to a predetermined process such as an image compression and a format conversion in a recording device control circuit (not shown), so that the pixel signals can be recorded on a recording medium such as an IC memory card, for examples, in an image recording device 67. The interface circuit 65 and the image recording device 67 are operated in accordance with a command signal outputted from the system control circuit 20.

An operation unit 72 including the main switch 10, the release switch 14, and the scan start switch 16 is connected to the system control circuit 20. A photography operation (i.e., a recording operation), in which an image is recorded on the electro-developing recording medium 30, and a reading operation, in which the image is read from the electro-developing recording medium 30, are performed by operating the operation unit 72. A display device 68 is connected to the system control circuit 20 to indicate various setting conditions of the electro-developing type camera. Further, an electric flash drive circuit 69 is connected to the system control circuit 20 to control the flash operation of the electronic flash 13.

Figure 3:
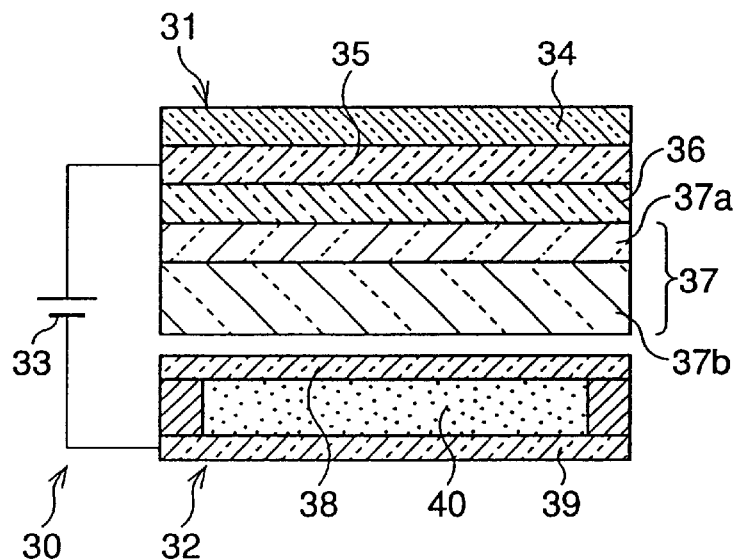
FIG. 3 is a sectional view showing a structure of an electro-developing recording medium.

FIG. 3 shows a structure of the electro-developing recording medium 30, and is the same as that shown in Japanese Unexamined Patent Publication No. 5-2280.

The electro-developing recording medium 30 has an electrostatic information recording medium 31 and an electric charge storage medium 32, and an electric voltage is applied thereto by an electric power source 33. The electrostatic information recording medium 31 is formed by laminating a glass base plate 34, an electrode layer 35, an inorganic oxide material layer 36 and a photoconducting layer 37, and the photoconducting layer 37 is formed by laminating an electric charge generating layer 37a and an electric charge transferring layer 37b. The electric charge storage medium 32 is formed by confining liquid crystal 40, which is a smectic liquid crystal, between a liquid crystal supporting plate 38 and a liquid crystal electrode layer 39. The electric charge transferring layer 37b of the photoconducting layer 37 and the liquid crystal supporting plate 38 of the electric charge storage medium 32 face each other with a small gap therebetween.

An ON-OFF condition of the electric power source 33 is controlled by the recording medium drive circuit 41 (see FIG. 2). When the electric power source 33 is turned on, an electric voltage is applied between the electrode layer 35 and the liquid crystal electrode layer 39, i.e., between the electrostatic information recording medium 31 and the electric charge storage medium 32. When the electrostatic information recording medium 31 is exposed while the electric voltage is applied, an electric charge is generated in the electrostatic information recording medium 31 in accordance with an image formed thereon. Since the intensity of the electric field applied to the liquid crystal 40 is changed in accordance with the electric charge, the image is indicated on the liquid crystal 40 as a visible image, and thus, an image of an object is developed. Namely, the visible image is generated in accordance with the electric charge.

The electric charge storage medium 32 is a liquid crystal display having a memory-type liquid crystal such as a smectic liquid crystal, and thus, the developed visible image is kept therein even if the electric field is removed. In the liquid crystal, the developed visible image can be deleted by heating the liquid crystal, using a heating device (not shown) at a predetermined temperature. In such a case, the same electric charge storage medium 32 can be used repeatedly.

Figure 4:
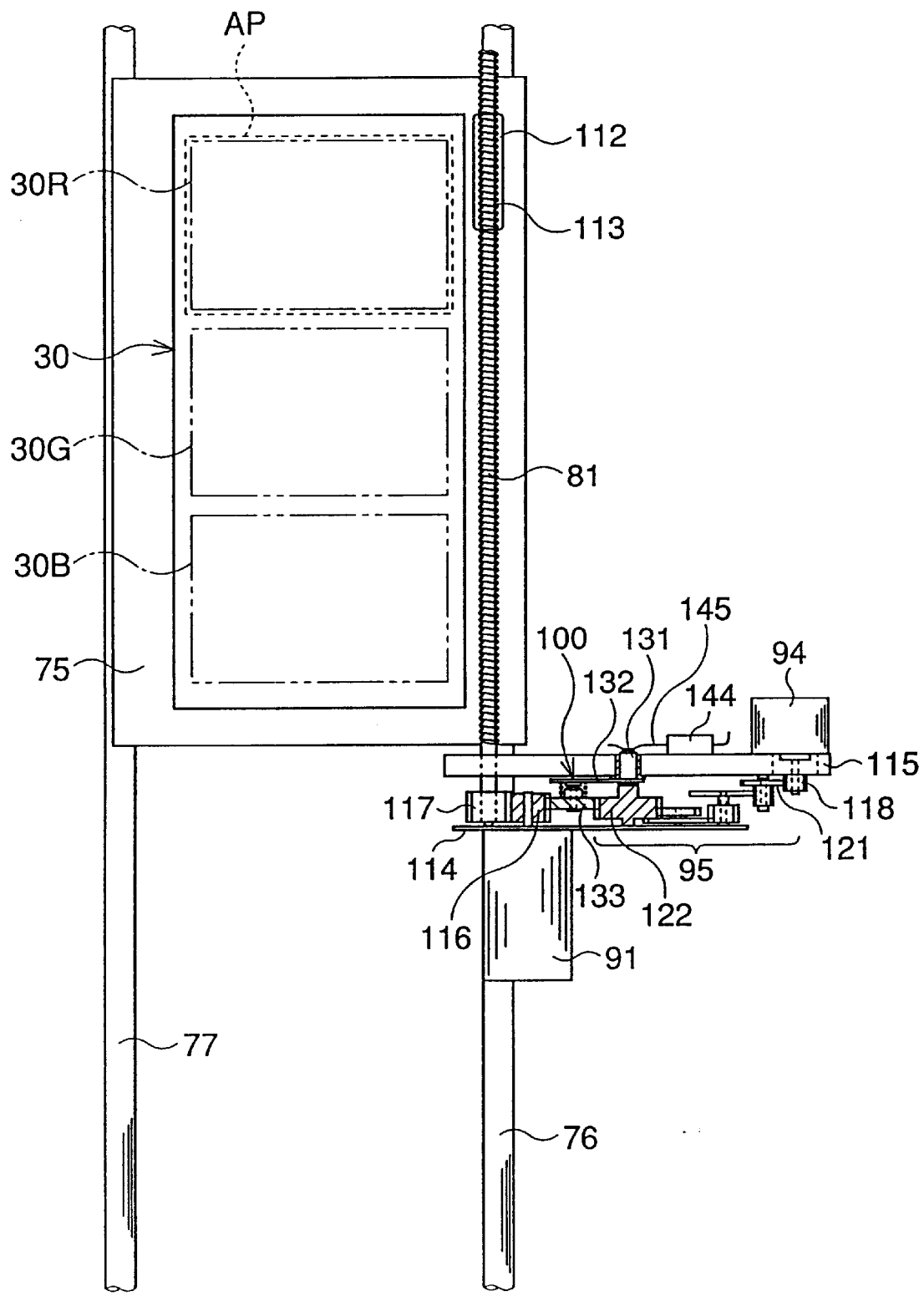
FIG. 4 is a front view showing a recording medium moving mechanism.
Figure 5:
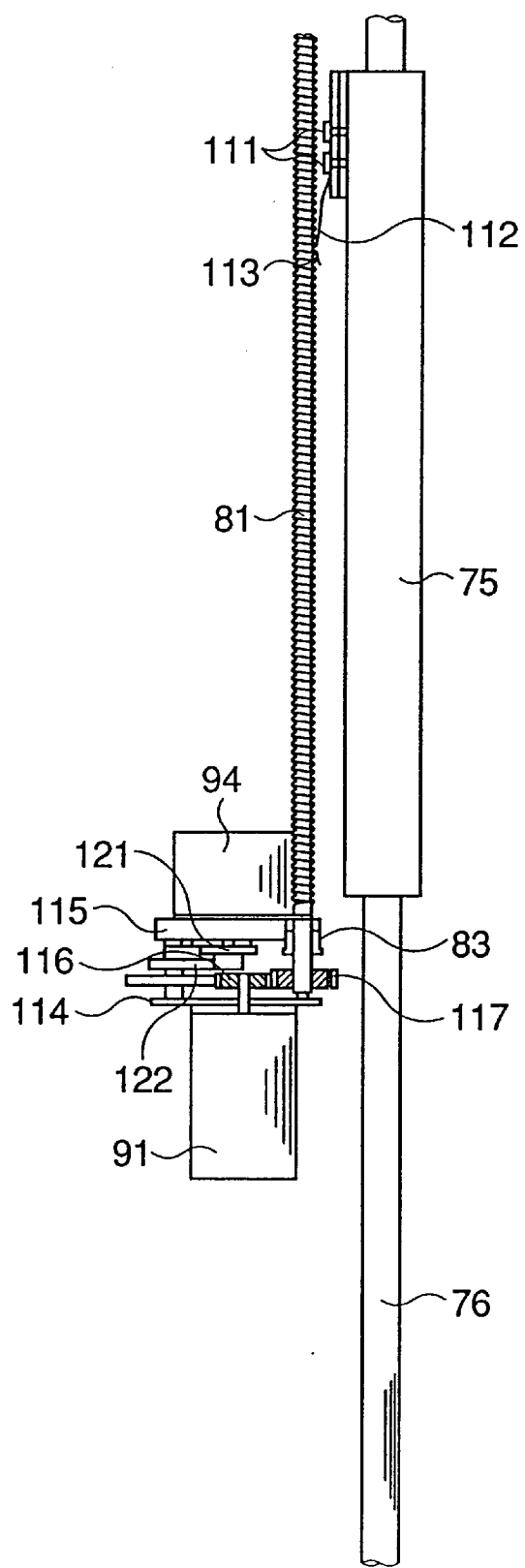
FIG. 5 is a side view showing the recording medium moving mechanism.

FIGS. 4 and 5 show constructions of the electro-developing recording medium 30 and the recording medium moving mechanism 80. In FIGS. 4 and 5, the electro-developing recording medium 30 is at an initial photographing position prior to executing a recording operation. Note that the color filter 70 is omitted. Further note that, in FIG. 4, a photographing aperture AP corresponds to the shutter 22.

The electro-developing recording medium 30 is moved by one frame of image at high speed by a DC motor (i.e., a first motor) 91 during the recording operation, so that R, G, and B images are recorded in the first, second, and third recording areas 30R, 30G, and 30B, respectively. After this recording operation, a reading operation is performed. Namely, the electro-developing recording medium 30 is moved one horizontal scanning line at a time at low speed by a stepping motor (i.e., a second motor) 94, and thus, the R, G, and B images are read out through the line sensor 44 (see FIG. 2).

The electro-developing recording medium 30 is attached to a recording medium holding member 75. When the electro-developing recording medium 30 is positioned at the initial photographing position, the first recording area 30R faces the photographing aperture AP.

The recording medium holding member 75 is slidably supported by a pair of shafts 76 and 77. One end of an engaging spring 112 is fixed to the recording medium holding member 75 by a fix pin 111. An engaging projection 113 is formed on a free end of the engaging spring 112, and is engaged with a groove formed on a feeding screw 81 which is provided in parallel to the recording medium holding member 75. The feeding screw 81 is rotatably supported by a first bearing 82, which is located at a lower end of the feeding screw 81, and a second bearing (not shown), which is located at an upper end of the feeding screw 81. Further, a gear 117 is tightly fitted on the lower end of the feeding screw 81.

The DC motor 91 is attached to a first support plate 114 provided to a fix frame (not shown), and the stepping motor 94 is attached to a second support plate 115 which is in parallel to the first support plate 114. A clutch 100 is disposed between these support plates 114 and 115.

Figure 8:
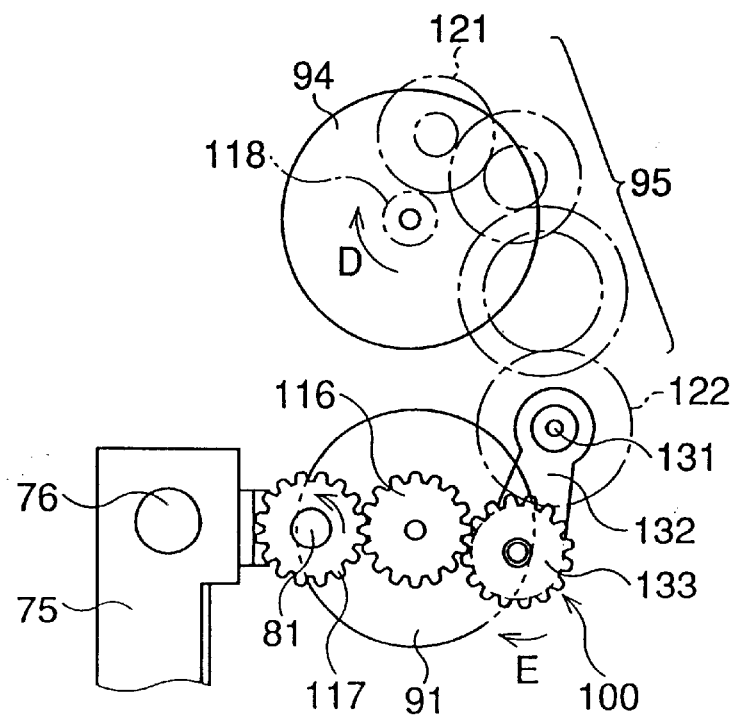
FIG. 8 is a plan view showing the clutch in a second connection state.
Figure 6:
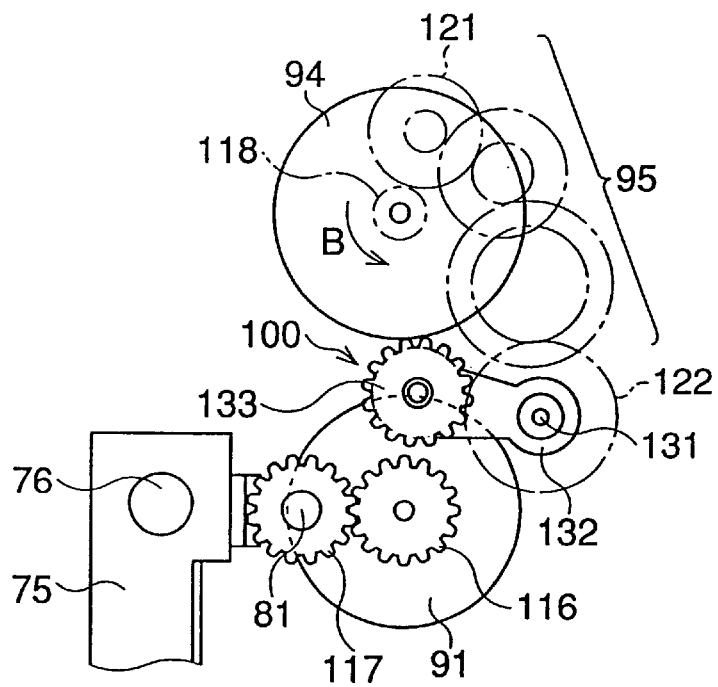
FIG. 6 is a plan view showing a clutch which is in a disconnect condition.
Figure 7:
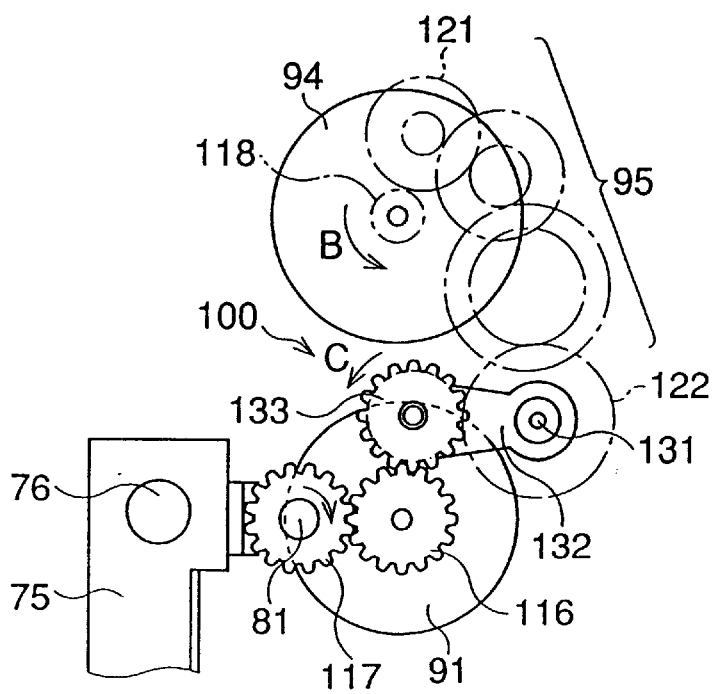
FIG. 7 is a plan view showing the clutch in a first connection state.

With reference to FIGS. 6 through 8, the clutch 100 and members provided therearound are described below. The clutch 100 has a rotatable arm 132 rotatably supported by the second support plate 115 (see FIG. 4), and a transmitting gear 133 rotatably provided on the rotatable arm 132. The rotatable arm 132 is connected to a rotational shaft 131 which is supported by the second support plate 115 and is rotatable about the axis thereof. The transmitting gear 133 can be threadingly engaged with a driven gear 116 fixed on an output shaft of the DC motor 91. The driven gear 116 always meshes with the gear 117 fixed on an end of the feeding screw 81. Namely, the DC motor 91 is connected to the recording medium moving mechanism.

A gear 118 fixed to an output shaft of the stepping motor 94 meshes with a gear 121 included in a reduction gear mechanism 95 composed of a plurality of gears. The end gear 122 included in the reduction gear mechanism 95 is fitted on the rotational shaft 131 of the clutch 100 through a frictional cylindrical member 135 (see FIG. 9), so that the end gear 122 can be rotated around the rotational shaft 131. The gear 122 always meshes with the transmitting gear 133. Therefore, the rotatable arm 132 is rotated in accordance with the rotatational direction of the gear 122, so that the transmitting gear 133 can be connected to or disconnected from the driven gear 116.

Thus, the stepping motor 94 can be connected to the recording medium moving mechanism (i.e., the feeding screw 81) through the clutch 100, and thus, the moving direction of the electro-developing recording medium 30 is changed in accordance with the position where the transmitting gear 133 is meshed with the driven gear 116, as described below.

FIG. 6 shows a state in which the transmitting gear 133 is released from the driven gear 116, that is, a state in which the clutch is open. In this state, if the gear 118 of the stepping motor 94 is rotated in the forward direction (i.e., counter-clockwise as shown by arrow B), the rotatable arm 132 is rotated in the forward direction shown by arrow C, so that the transmitting gear 133 is meshed with teeth of the driven gear 116, the teeth facing the stepping motor 94. As a result, the rotation of the stepping motor 94 is transmitted to the feeding screw 81 through the reduction gear mechanism 95 and the clutch 100, so that the feeding screw 81 is rotated in the clockwise direction in FIG. 7, and thus, the electro-developing recording medium 30 is moved upward, i.e., in a first direction. At this time, the DC motor 91 is rotated to reduce the load of the stepping motor 94. Namely, the stepping motor 94 and the DC motor 91 move the electro-developing recording medium 30 in association with each other.

Conversely, if the gear 118 of the stepping motor 94 is rotated in the reverse direction (i.e., clockwise as shown by arrow D) as shown in FIG. 8, the rotatable arm 132 is rotated clockwise as shown by arrow E, so that the transmitting gear 133 is meshed with teeth of the driven gear 116, the teeth not facing the stepping motor 94. As a result, the feeding screw 81 is rotated counterclockwise in FIG. 8, and thus, the electro-developing recording medium 30 is moved downward. Namely, the electro-developing recording medium 30 is moved in a second direction which is opposite to the first direction.

In the engaged conditions shown in FIGS. 7 and 8, if the stepping motor 94 is rotated in the opposite direction which is opposite direction from the engagement, the rotatable arm 132 is rotated in the reverse direction by a predetermined amount, so that the transmitting gear 133 is released from the driven gear 116. This action causes the state shown in FIG. 6.

Figure 9:
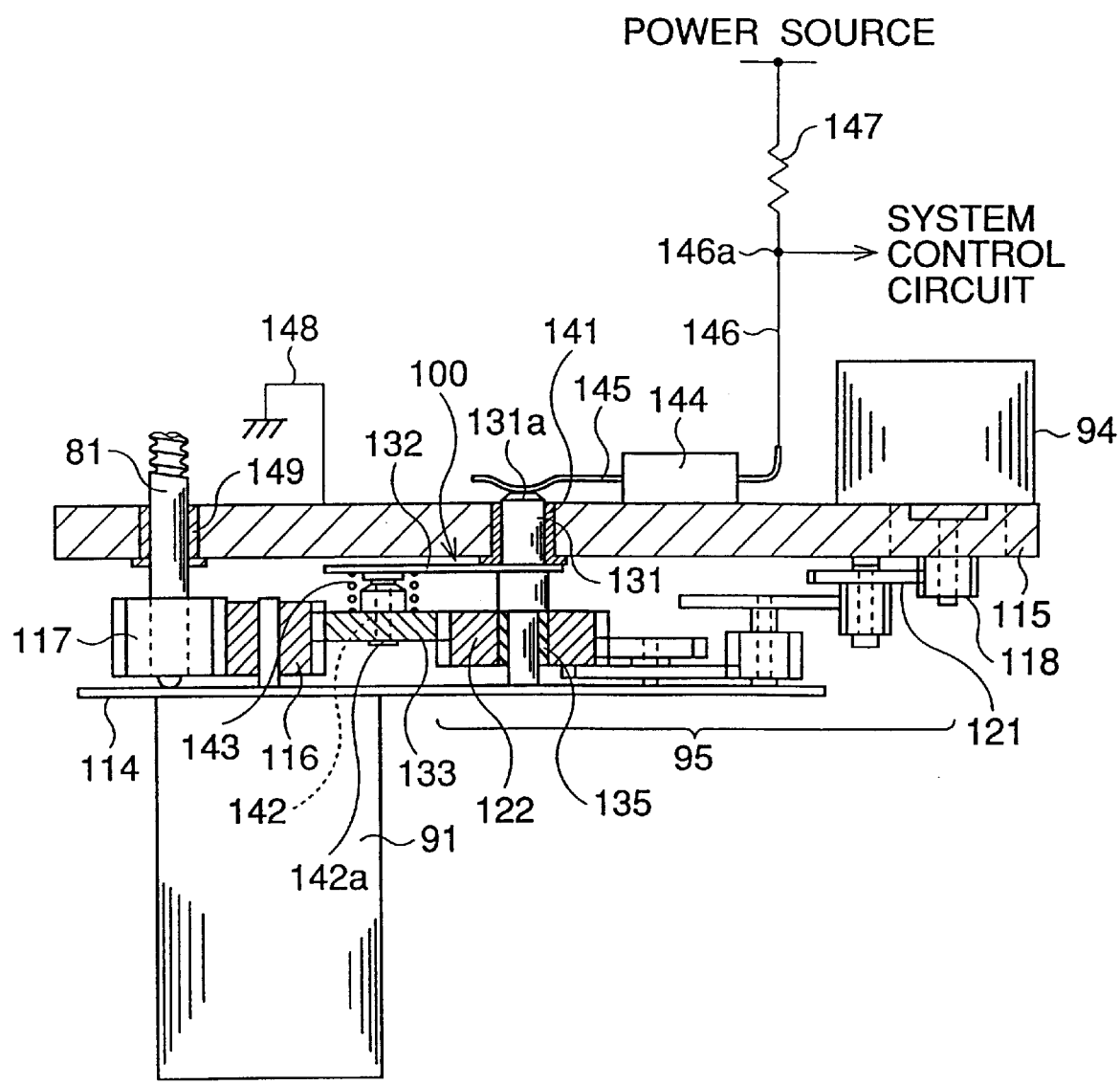
FIG. 9 is a view showing a construction for sensing a connection state of the clutch.

FIG. 9 is an enlarged view showing the clutch 100 and the members provided therearound, which are shown in FIG. 4, and showing a construction for sensing the connect condition of the clutch 100.

A cylindrical member 141 made of insulating material is fitted in the second support plate 115, and the cylindrical member 141 is provided between the rotational shaft and the second support plate 141. Namely, the rotational shaft 131 is rotatably supported by the second support plate 115 through the cylindrical member 141, and the rotational shaft 131 and the second support plate 115 are electrically insulated. The transmitting gear 133 is supported by a pin 142 fixed to the rotatable arm 132 so that the transmitting gear 133 is rotatable about the axis thereof and can be moved along the pin 142. The transmitting gear 133 is urged by a spring 143 to come in contact with a large diameter portion 142a formed on a lower end of the pin 142. The transmitting gear 133, the pin 142, the rotatable arm 132, and the rotational shaft 131 are made of conductive material, respectively, and therefore, the transmitting gear 133, the rotatable arm 132, and the rotational shaft 131 are electrically connected to each other.

A contact member 145 having elasticity is attached to an insulating member 144 fixed on an upper surface of the second support plate 115, and one end of the contact member 145 is in elastical contact with a tip portion 131a of the rotational shaft 131, which projects from the support plate 115. The contact member 145 is made of conductive material, and the other end of the contact member 145, which is opposite to the rotational shaft 131, connected to an electric power source through a lead line 146 and a pull-up resistor 147. The lead line 146 is divided into two lines at a branch portion 146a, so that one line is connected to the power source and another line is connected to the system control circuit 20 (see FIG. 2).

The feeding screw 81 is slidably and rotatably supported by a bearing 149 provided to the support plate 115. The feeding screw 81, the bearing 149, and the gears 116 and 117 are made of conductive material, respectively. The support plate 115 is grounded through a lead line 148, and therefore, an electric potential of the driven gear 116 is kept to the ground level through the gear 117, the feeding screw 81, the bearing 149, the support plate 115, and the lead line 148.

Thus, when the transmitting gear 133 and the driven gear 116 are meshed with each other, a voltage signal of 0 volt, which is an ON signal, is outputted to the system control circuit 20 through the transmitting gear 133, the pin 142, the rotatable arm 132, the rotational shaft 131, the contact member 145, and lead line 146. Conversely, when the transmitting gear 133 and the driven gear 116 are released from each other, a voltage signal of a predetermined level, which is an OFF signal, is outputted to the system control circuit 20 through the power source, the resistor 147, and lead line 146. In accordance with these voltage signals, the connect condition of the clutch 100 is detected by the system control circuit 20.

Figure 10:
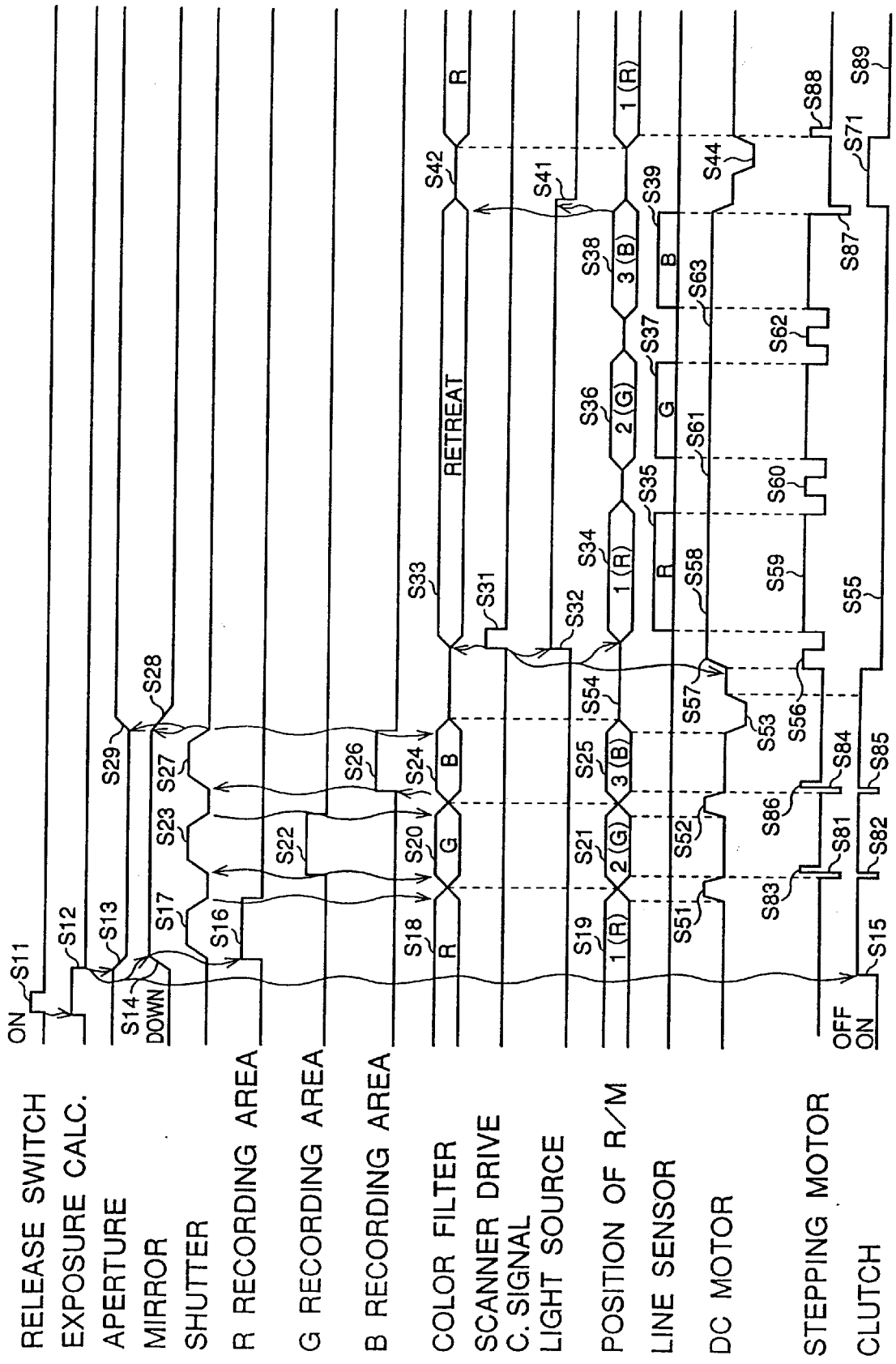
FIG. 10 is a timing chart showing a recording operation and a reading operation.

FIG. 10 shows a timing chart of the recording operation and the reading operation. With reference to the drawing, an operation of the embodiment will be described. Note that the electro-developing recording medium 30 is positioned at the photographing initial position, which is shown in FIG. 4.

When it is sensed that the release switch 14 has been turned ON (reference S11), an output signal of the photometry sensor 28, i.e., a photometry value, is sensed, and a photometry calculation is performed based on the photometry value (reference S12). Based on the result of the photometry calculation, the opening degree of the aperture 12a is changed from the fully open state to a predetermined opening degree (reference S13). Then, the quick return mirror 21 is changed from the down condition to the up-condition (reference S14). Further, the stepping motor 94 is rotated in a predetermined direction by a predetermined amount, so that the clutch 100 is set to a disconnect condition (see FIG. 6) (reference S15).

When it is confirmed that the quick return mirror 21 has been changed to the up-condition and the opening degree adjustment of the aperture 12a has been completed, a recording medium activating signal corresponding to the first recording area 30R is set to an ON-state (reference S16) so that a voltage is applied to the first recording area 30R. At the same time, the shutter 22 is opened for an exposure period (reference S17) which is obtained by the photometry calculation (reference S12).

Note that, prior to the opening operation of the shutter 22, the color filter 70 has been positioned in such a manner that the R filter element 70R faces the shutter 22 (reference S18) and the first recording area 30R faces the R filter element 70R (reference S19). Namely, the R filter element 70R and the first recording area 30R are positioned on the optical path of the photographing optical system 12. Therefore, an R image is formed or developed on the first recording area 30R.

Note that the position of the electro-developing recording medium 30 is obtained based on a position signal, which is outputted by an initial position sensor (not shown) sensing the photographing initial position, and a command signal, which is outputted by the system control circuit 20 to rotate the DC motor 91. The position of the color filter 70 is obtained by a construction similar to that for the position of the electro-developing recording medium 30.

When the shutter 22 is closed, the filter drive mechanism 71 is operated so that the color filter 70 is moved upward by one frame of image. At the same time, the DC motor 91 is rotated in the forward direction so that the electro-developing recording medium 30 is moved by one frame of image (reference S51). Thus, the G filter element 70G and the second recording area 30G are set to the optical path of the photographing optical system 12. Namely, the G filter element 70G faces the shutter 22 (reference S20), and the second recording area 30G faces the G filter element 70G (reference S21).

Then, the stepping motor 94 is rotated in the reverse direction by a predetermined amount (reference S81), and thus, the clutch 100 becomes to a connect condition (reference S82), and the electro-developing recording medium 30 slightly descends so that the position thereof is minutely or precisely adjusted. Note that, in this minute adjustment, the DC motor 91 is substantially stopped, so that the stepping motor 94 is subjected to a load rotating the DC motor 91, and thus, an error component due to backlash and so on are removed.

After this minute adjustment, the stepping motor 94 is rotated in the forward direction by a predetermined amount (reference S83), so that the clutch 100 becomes to a disconnect condition. Then, the recording medium activating signal of the second recording area 30G is set to the ON condition (reference S22) so that an electric voltage is applied to the second recording area 30G, and the shutter 22 is opened for the exposure period (reference S23) which is obtained by the photometry calculation. Therefore, the G image is formed or developed on the second recording area 30G.

When the shutter 22 is closed, the color filter 70 and the electro-developing recording medium 30 are again moved upward by one frame of image, respectively (reference S52). Thus, the B filter element 70B faces the shutter 22 (reference S24), and the third recording area 30B faces the B filter element 70B (reference S25). Then, the stepping motor 94 is rotated in the reverse direction by a predetermined amount (reference S84), and thus, the clutch 100 becomes to a connected condition (reference S85), and the minute adjustment of the position of the electro-developing recording medium 30 is carried out. After this minute adjustment, the stepping motor 94 is rotated in the forward direction by a predetermined amount (reference S86), so that the clutch 100 becomes to a disconnected condition. Then, the recording medium activating signal of the third recording area 30B is set to the ON condition (reference S26) so that an electric voltage is applied to the third recording area 30B, and the shutter 22 is opened for the exposure period (reference S27) which is obtained by the photometry calculation. Therefore, the B image is formed or developed on the third recording area 30B.

When the R, G and B images have been developed by the recording areas 30R, 30G and 30B, the quick return mirror 21 is changed to the down-condition (reference S28) and the aperture 12a is driven to the fully open condition (reference S29). On the other hand, the DC motor 91 is rotated in the reverse direction (reference S53), and thus, the electro-developing recording medium 30 descends and this movement continues until the recording areas 30R, 30G, and 30B are offset from the optical path of the photographing optical system 12 (reference S54).

When the scan start switch 16 is depressed and a scanner drive command signal is outputted (reference S31), the light source 42 is lit (reference S32). The color filter 70 is retreated to a retract position by the filter drive mechanism 71, so that all of the filter elements 70R, 70G, and 70B are offset from the optical path of the scanner optical system 43 (reference S33). The stepping motor 94 is rotated in the forward direction (reference S56), so that, in the clutch 100, the transmitting gear 133 is meshed with teeth of the driven gear 116, i.e., the teeth facing the stepping motor 94 (reference S55).

Then, the stepping motor 94 and the DC motor 91 are driven by the system control circuit 20 so that the feeding screw 81 is rotated at the same speed (references S56 and S57), and thus, the electro-developing recording medium 30 is set at a position where an upper end portion of the first recording area 30R faces the line sensor 44. Namely, in this positioning operation, the electro-developing recording medium 30 is moved by the stepping motor 94 and the DC motor 91. Note that the DC motor 91 is intentionally driven to reduce the load of the stepping motor 94.

Then, the stepping motor 94 and the DC motor 91 are driven by the system control circuit 20 so that the feeding screw 81 is rotated at the same speed (references S58 and S59), so that an image recorded on the first recording area 30R of the electro-developing recording medium 30 is scanned. Namely, the first recording area 30R of the electro-developing recording medium 30 is moved by a width of one horizontal scanning line and is stopped. During the stop of the electro-developing recording medium 30, the image of the recording area 30R is sensed by the line sensor 44. Thus, in the feeding of the electro-developing recording medium 30 by one horizontal scanning line, the DC motor 91 is driven to reduce the load of the stepping motor 94 in a same way as the positioning operation described above.

Then, while the electro-developing recording medium 30 is moved by one horizontal scanning line in the next cycle, the image signal corresponding to one horizontal scanning line is read from the line sensor 44. Such a movement of the electro-developing recording medium 30 and an output of the image signal from the line sensor 44 are repeated, the image signal of the first recording area 30R is read out through the line sensor 44 (references S34 and S35).

When the output operation of the R image signal recorded in the first recording area 30R is completed, each of the stepping motor 94 and the DC motor 91 is once stopped, and then rotated by a predetermined amount (references S60 and S61), so that the electro-developing recording medium 30 is set at a position where an upper end portion of the second recording area 30G faces the line sensor 44. Then, similar to the reading operation of the image signal recorded in the first recording area 30R, the image recorded in the second recording area 30G is scanned (references S36 and S37).

When the output operation of the G image signal recorded in the second recording area 30G is completed, each of the stepping motor 94 and the DC motor 91 is once stopped, and then rotated by a predetermined amount (references S62 and S63), so that the electro-developing recording medium 30 is set at a position where an upper end portion of the third recording area 30B faces the line sensor 44. Then, the image recorded in the third recording area 30B is scanned (references S38 and S39).

When the output operation of the B image signal recorded is completed, the stepping motor 94 is rotated in the reverse direction by a predetermined amount (reference S87), so that the clutch 100 is set to a disconnect condition (reference S71). At the same time, the light source 42 is turned OFF (reference S41), and the color filter 70 is set to the initial position (reference S42). Then, the DC motor 91 is rotated in the reverse direction (reference S44), so that the electro-developing recording medium 30 is set at a position where the electro-developing recording medium 30 has been set before the reading operation. The stepping motor 94 is rotated in the forward direction (reference S88), and thus, the clutch 100 is set to a connect condition (reference S89).

As described above, in the first embodiment, when the electro-developing recording medium 30 is moved by the stepping motor 94, i.e., when the clutch 100 is connected, the DC motor 91 is rotated under the control of the system control circuit 20, in such a manner that the electro-developing recording medium is moved approximately at the same speed as the stepping motor 94. In other words, when the clutch 100 is connected, the DC motor 91 is rotated so as to reduce the load of the stepping motor 94.

Consequently, according to the embodiment, in a construction in which the electro-developing recording medium 30 is moved by one frame of image by the DC motor 91, and the electro-developing recording medium 30 is moved one horizontal scanning line at a time by the stepping motor 94 to read the image from the electro-developing recording medium 30, only the single clutch 100 is needed. Therefore, the construction of the movement control device is simple and miniaturized.

Further, according to the embodiment, since the direction of movement the electro-developing recording medium 30 can be changed by forwardly and reversely rotating the stepping motor 94, the position of the electro-developing recording medium 30 can be precisely adjusted after the movement of the electro-developing recording medium 30 by the DC motor 91. Therefore, the relative positions of the three images of R, G, and B can be precisely set on the electro-developing recording medium 30.

Furthermore, the connection and disconnection of the clutch 100, i.e., the connection and disconnection between the transmitting gear 133 and driven gear 116, is detected in accordance with the voltage level of the voltage signal outputted through the lead line 146. Namely, an exclusive switch for sensing the connecting condition of the clutch 100 need not be provided, so that the support plates 114 and 115 can be miniaturized.

Note that, instead of the construction in which the transmitting gear 133 is pulled-up to the power source and the driven gear 116 is grounded, a signal indicating the connecting condition of the clutch 100 can be outputted through the driven gear 116.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 8-83319 (filed on Mar. 12, 1996), No. 8-87470 (filed on Mar. 15, 1996), and No. 8-160625 (filed on May 31, 1996) which are expressly incorporated herein, by reference, in their entirety.

What is claimed is:

1. A device for detecting a connecting condition of a clutch, said device comprising:

a driven gear made of a conductive material, a first electric potential being applied to said driven gear;

a rotatable arm made of a conductive material, a second electric potential which is different from said first electric potential being applied to said rotatable arm;

a transmitting gear made of a conductive material, said transmitting gear being rotatably provided on said rotatable arm, and being able to mesh with said driven gear; and a sensing unit for sensing an electric potential of one of said driven gear and said rotatable arm so that a meshing condition between said transmitting gear and said driven gear is sensed.

2. A device according to claim 1, further comprising a support plate and a rotational shaft supported by said support plate, said rotational shaft being rotatable about the axis thereof, said rotatable arm being connected to said rotational shaft, and said sensing unit sensing said connecting condition through said rotational shaft.

3. A device according to claim 2, further comprising a cylindrical member made of insulating material, said cylindrical member being provided between said rotational shaft and said support plate.

4. A device according to claim 1, further comprising a motor rotating said transmitting gear, said rotatable arm being rotated in a first rotational direction when said motor is rotated in the forward direction, so that said transmitting gear meshes with said driven gear at a first point, and said rotatable arm being rotated in a second rotational direction reverse to said first rotational direction when said motor is rotated in the reverse direction, so that said transmitting gear meshes with said driven gear at a second point different from said first point.

5. A device according to claim 1, wherein said rotational arm is rotated in a first rotational direction so that said transmitting gear is meshed with said driven gear, and then, said rotatable arm is rotated in a second rotational direction reverse to said first rotational direction by a predetermined amount so that said transmitting gear is released from said driven gear.

* * * * *